United States Patent
Sosa et al.

(10) Patent No.: US 9,264,187 B1
(45) Date of Patent: Feb. 16, 2016

(54) MEASURING BIT ERROR RATE DURING RUNTIME OF A RECEIVER CIRCUIT

(71) Applicant: Intel Corporation, Santa Clara, CA (US)

(72) Inventors: Gaudencio Hernandez Sosa, Guadalajara (MX); Varvara Kollia, Santa Clara, CA (US)

(73) Assignee: Intel Corporation

( * ) Notice: Subject to any disclaimer, the term of this patent is extended or adjusted under 35 U.S.C. 154(b) by 0 days.

(21) Appl. No.: 14/510,572

(22) Filed: Oct. 9, 2014

(51) Int. Cl.
*H04B 3/46* (2015.01)
*H04L 1/20* (2006.01)
*H04L 25/03* (2006.01)
*H04L 1/00* (2006.01)

(52) U.S. Cl.
CPC .............. *H04L 1/203* (2013.01); *H04L 1/0033* (2013.01); *H04L 25/03057* (2013.01); *H04L 25/03343* (2013.01)

(58) Field of Classification Search
CPC .............. H04B 3/46; H04B 3/02; H04B 7/02
See application file for complete search history.

(56) References Cited

U.S. PATENT DOCUMENTS

| 4,500,999 | A  | * | 2/1985 | Takatori et al. | 375/236 |
|---|---|---|---|---|---|
| 4,937,826 | A  | * | 6/1990 | Gheewala et al. | 714/724 |
| 6,778,831 | B1 | * | 8/2004 | Sancho et al. | 455/436 |
| 7,900,098 | B2 |   | 3/2011 | Becker et al. | |
| 8,327,198 | B2 |   | 12/2012 | Zhong et al. | |
| 8,885,695 | B1 | * | 11/2014 | Kang et al. | 375/227 |
| 2007/0126614 | A1 | * | 6/2007 | Lazar | 341/120 |
| 2008/0266163 | A1 | * | 10/2008 | Poulton | 341/161 |
| 2009/0018787 | A1 | * | 1/2009 | Chuang et al. | 702/71 |
| 2011/0128085 | A1 | * | 6/2011 | Marrero et al. | 332/109 |
| 2012/0033685 | A1 | * | 2/2012 | Doblar et al. | 370/535 |
| 2013/0294782 | A1 | * | 11/2013 | Liboiron-Ladouceur et al. | 398/202 |
| 2014/0281763 | A1 | * | 9/2014 | Ran et al. | 714/704 |

* cited by examiner

*Primary Examiner* — Jaison Joseph
(74) *Attorney, Agent, or Firm* — Trop, Pruner & Hu, P.C.

(57) ABSTRACT

In one embodiment, a receiver includes: a data path having a first slicer to receive and sample an incoming analog signal and to determine a bit level for the incoming analog signal, the first slicer to provide a bit decision to a consuming logic; an analysis path having a second slicer to receive and sample the incoming analog signal and to determine a second bit level for the incoming analog signal; and a controller coupled to receive an output of the first slicer and an output of the second slicer to determine a bit error rate for the data path based on the first and second slicer outputs. Other embodiments are described and claimed.

19 Claims, 11 Drawing Sheets

MEASURING BIT ERROR RATE DURING RUNTIME OF A RECEIVER CIRCUIT

TECHNICAL FIELD

Embodiments relate to bit error rate measurements in a circuit.

BACKGROUND

As data rates in computing devices increase and power budgets decrease, various design objectives are in opposition. For example, in the design and implementation of high-speed interconnects that are used to communicate data within and to and from integrated circuits and other components of one or more systems, voltage and timing eye margins become tighter. Consequently, resulting interconnects are more sensitive and may suffer data corruption due either to variations in the manufacturing process or variations in operating conditions (temperature gradients, electromagnetic noise, aging, etc.).

For this reason, bit error ratio (BER) measurements are performed during design, development, and testing to ensure an interconnect is fully operational and to eventually tune transmitter/receiver setting in order to guarantee a good error performance. However, online BER measurements (during normal operation of a product) typically are not currently available, particularly in high-speed interconnects as such online techniques require high power consumption, computational complexity, or a loopback path between transmitter and receiver, all of which prevent efficient operation of an interconnect.

DETAILED DESCRIPTION

Figure 1:
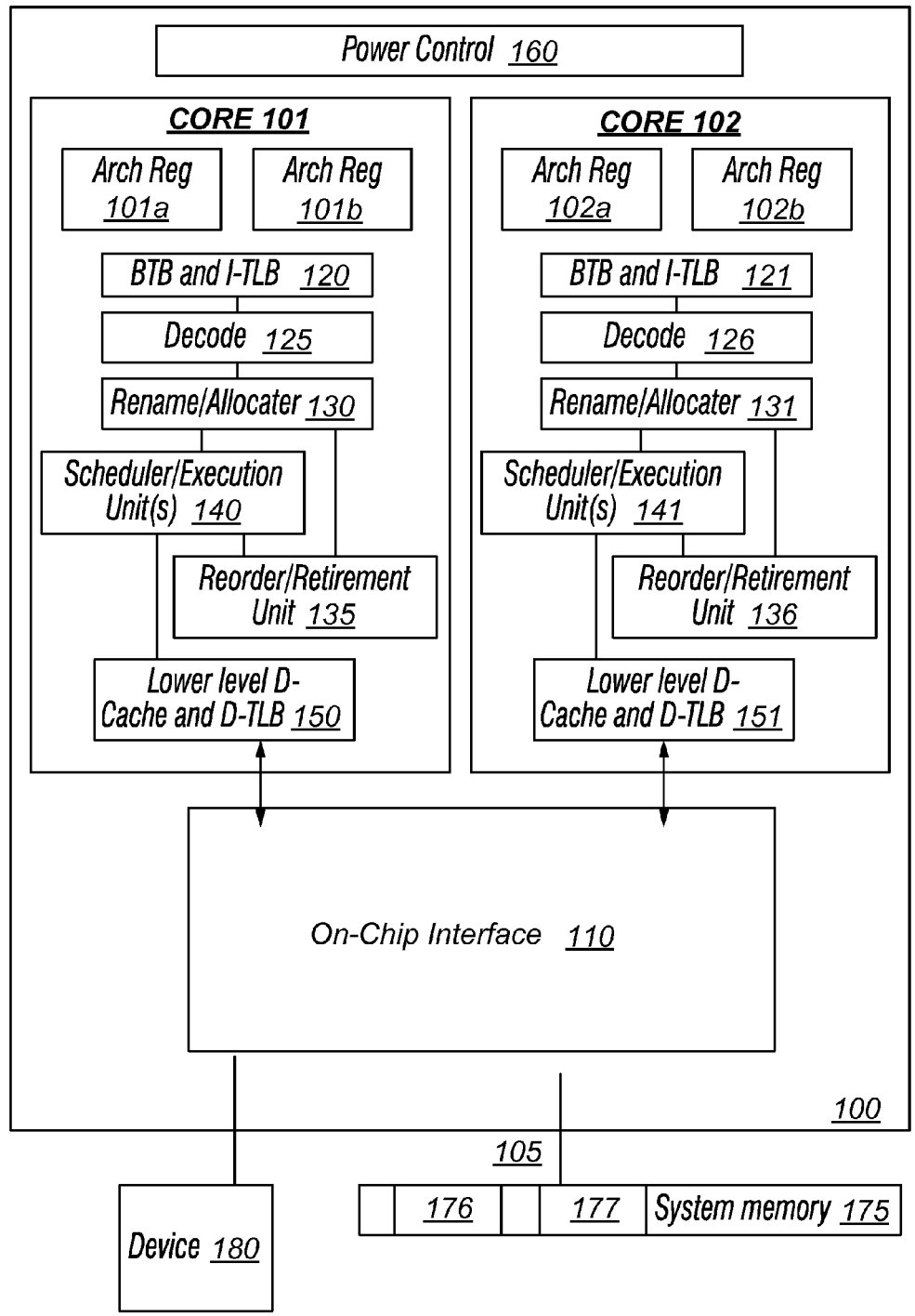
FIG. 1 is an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

One interconnect fabric architecture includes the PCIe architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 2:
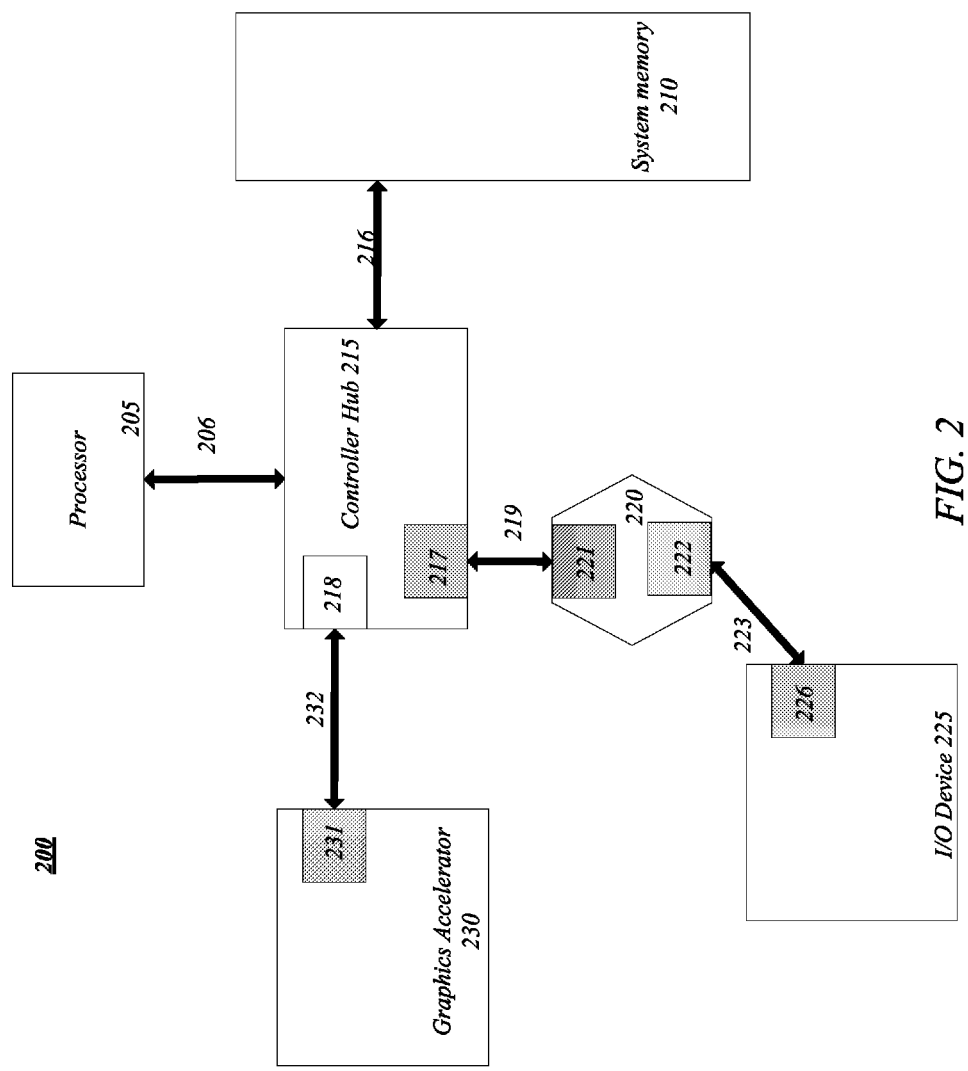
FIG. 2 is an embodiment of a fabric composed of point-to-point links that interconnect a set of components.

Referring to FIG. 2, an embodiment of a fabric composed of point-to-point Links that interconnect a set of components is illustrated. System 200 includes processor 205 and system memory 210 coupled to controller hub 215. Processor 205 includes any processing element, such as a microprocessor, a host processor, an embedded processor, a co-processor, or other processor. Processor 205 is coupled to controller hub 215 through front-side bus (FSB) 206. In one embodiment, FSB 206 is a serial point-to-point interconnect as described below. In another embodiment, link 206 includes a serial, differential interconnect architecture that is compliant with different interconnect standard.

System memory 210 includes any memory device, such as random access memory (RAM), non-volatile (NV) memory, or other memory accessible by devices in system 200. System memory 210 is coupled to controller hub 215 through memory interface 216. Examples of a memory interface include a double-data rate (DDR) memory interface, a dual-channel DDR memory interface, and a dynamic RAM (DRAM) memory interface.

In one embodiment, controller hub 215 is a root hub, root complex, or root controller in a Peripheral Component Interconnect Express (PCIe or PCIE) interconnection hierarchy. Examples of controller hub 215 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 205, while controller 215 is to communicate with I/O devices, in a similar manner as described below. In some embodiments, peer-to-peer routing is optionally supported through root complex 215.

Here, controller hub 215 is coupled to switch/bridge 220 through serial link 219. Input/output modules 217 and 221, which may also be referred to as interfaces/ports 217 and 221, include/implement a layered protocol stack to provide communication between controller hub 215 and switch 220. In one embodiment, multiple devices are capable of being coupled to switch 220.

Switch/bridge 220 routes packets/messages from device 225 upstream, i.e. up a hierarchy towards a root complex, to controller hub 215 and downstream, i.e. down a hierarchy away from a root controller, from processor 205 or system memory 210 to device 225. Switch 220, in one embodiment, is referred to as a logical assembly of multiple virtual PCI-to-PCI bridge devices. Device 225 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device, is referred to as an endpoint. Although not specifically shown, device 225 may include a PCIe to PCI/PCI-X bridge to support legacy or other version PCI devices. Endpoint devices in PCIe are often classified as legacy, PCIe, or root complex integrated endpoints.

Graphics accelerator 230 is also coupled to controller hub 215 through serial link 232. In one embodiment, graphics accelerator 230 is coupled to an MCH, which is coupled to an ICH. Switch 220, and accordingly I/O device 225, is then coupled to the ICH. I/O modules 231 and 218 are also to implement a layered protocol stack to communicate between graphics accelerator 230 and controller hub 215. Similar to the MCH discussion above, a graphics controller or the graphics accelerator 230 itself may be integrated in processor 205.

Figure 3:
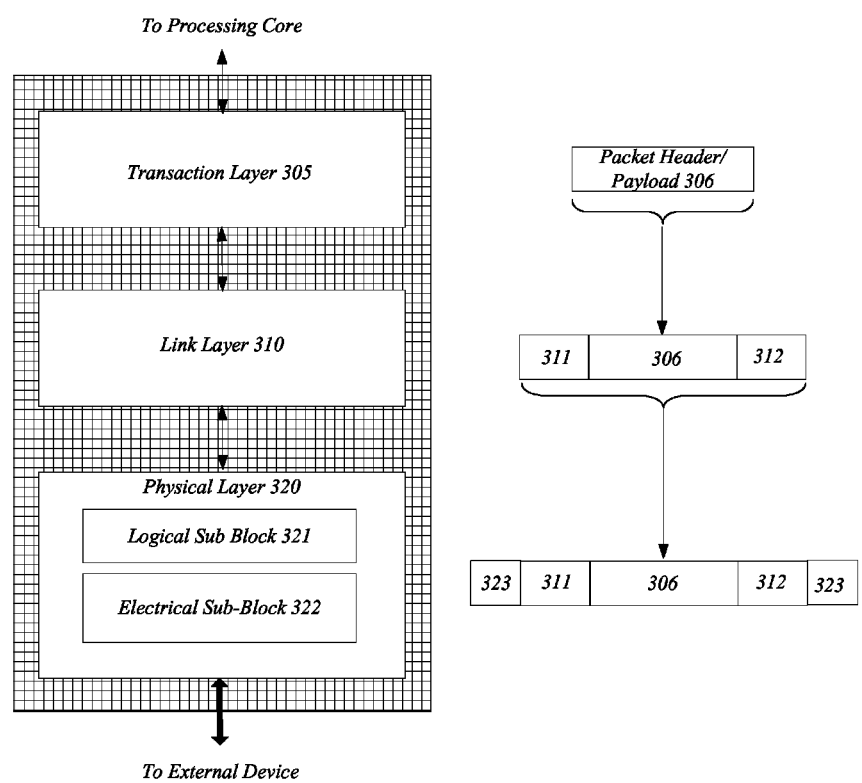
FIG. 3 is an embodiment of a layered protocol stack.

Turning to FIG. 3 an embodiment of a layered protocol stack is illustrated. Layered protocol stack 300 includes any form of a layered communication stack, such as a Quick Path Interconnect (QPI) stack, a PCIe stack, a next generation high performance computing interconnect stack, or other layered stack. Although the discussion immediately below in reference to FIGS. 2-5 are in relation to a PCIe stack, the same concepts may be applied to other interconnect stacks. In one embodiment, protocol stack 300 is a PCIe protocol stack including transaction layer 305, link layer 310, and physical layer 320. An interface may be represented as communication protocol stack 300. Representation as a communication protocol stack may also be referred to as a module or interface implementing/including a protocol stack.

PCI Express uses packets to communicate information between components. Packets are formed in the Transaction Layer 305 and Data Link Layer 310 to carry the information from the transmitting component to the receiving component. As the transmitted packets flow through the other layers, they are extended with additional information necessary to handle packets at those layers. At the receiving side the reverse process occurs and packets get transformed from their Physical Layer 320 representation to the Data Link Layer 310 representation and finally (for Transaction Layer Packets) to the form that can be processed by the Transaction Layer 305 of the receiving device.

In one embodiment, transaction layer 305 is to provide an interface between a device's processing core and the interconnect architecture, such as data link layer 310 and physical layer 320. In this regard, a primary responsibility of the transaction layer 305 is the assembly and disassembly of packets (i.e., transaction layer packets, or TLPs). The transaction layer 305 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 305. An external device at the opposite end of the link, such as controller hub, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 305 assembles packet header/payload 306. Format for current packet headers/payloads may be found in the PCIe specification at the PCIe specification website.

Figure 4:
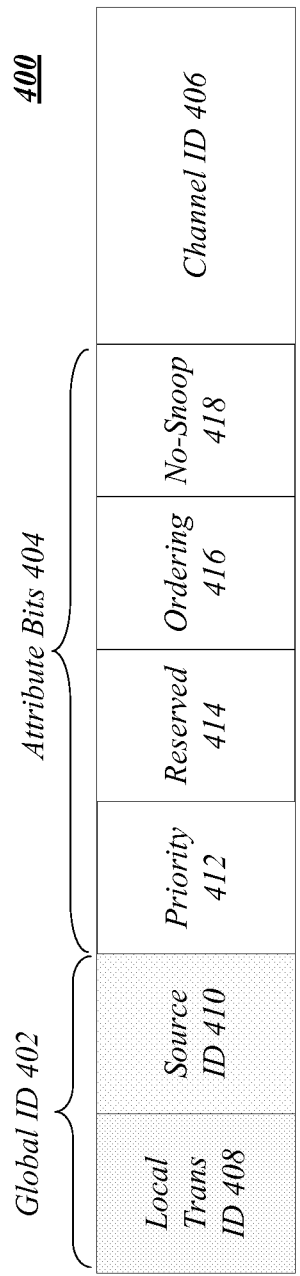
FIG. 4 is an embodiment of a PCIe transaction descriptor.

Quickly referring to FIG. 4, an embodiment of a PCIe transaction descriptor is illustrated. In one embodiment, transaction descriptor 400 is a mechanism for carrying transaction information. In this regard, transaction descriptor 400 supports identification of transactions in a system. Other potential uses include tracking modifications of default transaction ordering and association of transaction with channels.

Transaction descriptor 400 includes global identifier field 402, attributes field 404 and channel identifier field 406. In the illustrated example, global identifier field 402 is depicted comprising local transaction identifier field 408 and source identifier field 410. In one embodiment, global transaction identifier 402 is unique for all outstanding requests.

According to one implementation, local transaction identifier field 408 is a field generated by a requesting agent, and it is unique for all outstanding requests that require a completion for that requesting agent. Furthermore, in this example, source identifier 410 uniquely identifies the requestor agent within a PCIe hierarchy. Accordingly, together with source ID 410, local transaction identifier 408 field provides global identification of a transaction within a hierarchy domain.

Attributes field 404 specifies characteristics and relationships of the transaction. In this regard, attributes field 404 is potentially used to provide additional information that allows modification of the default handling of transactions. In one embodiment, attributes field 404 includes priority field 412, reserved field 414, ordering field 416, and no-snoop field 418. Here, priority sub-field 412 may be modified by an initiator to assign a priority to the transaction. Reserved attribute field 414 is left reserved for future, or vendor-defined usage. Possible usage models using priority or security attributes may be implemented using the reserved attribute field.

In this example, ordering attribute field 416 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 418 is utilized to determine if transactions are snooped. As shown, channel ID Field 406 identifies a channel that a transaction is associated with.

Link layer 310, also referred to as data link layer 310, acts as an intermediate stage between transaction layer 305 and the physical layer 320. In one embodiment, a responsibility of the data link layer 310 is providing a reliable mechanism for exchanging Transaction Layer Packets (TLPs) between two components a link. One side of the Data Link Layer 310 accepts TLPs assembled by the Transaction Layer 305, applies packet sequence identifier 311, i.e. an identification number or packet number, calculates and applies an error detection code, i.e. CRC 312, and submits the modified TLPs to the Physical Layer 320 for transmission across a physical to an external device.

In one embodiment, physical layer 320 includes logical sub block 321 and electrical sub-block 322 to physically transmit a packet to an external device. Here, logical sub-block 321 is responsible for the "digital" functions of Physical Layer 321. In this regard, the logical sub-block includes a transmit section to prepare outgoing information for transmission by physical sub-block 322, and a receiver section to identify and prepare received information before passing it to the Link Layer 310.

Physical block 322 includes a transmitter and a receiver. The transmitter is supplied by logical sub-block 321 with symbols, which the transmitter serializes and transmits onto to an external device. The receiver is supplied with serialized symbols from an external device and transforms the received signals into a bit-stream. The bit-stream is de-serialized and supplied to logical sub-block 321. In one embodiment, an 8b/10b transmission code is employed, where ten-bit symbols are transmitted/received. Here, special symbols are used to frame a packet with frames 323. In addition, in one example, the receiver also provides a symbol clock recovered from the incoming serial stream.

As stated above, although transaction layer 305, link layer 310, and physical layer 320 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a QPI layered protocol is utilized.

Figure 5:
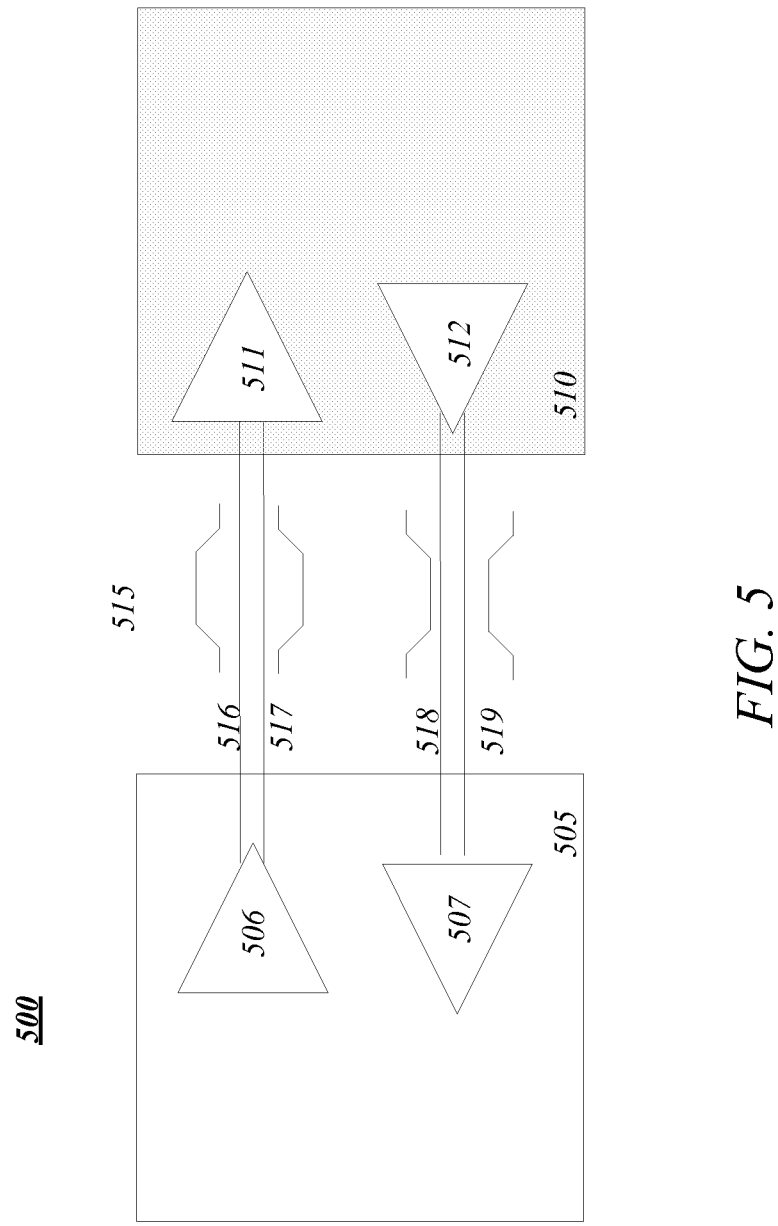
FIG. 5 is an embodiment of a PCIe serial point to point fabric.

Referring next to FIG. 5, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 506/511 and a receive pair 512/507. Accordingly, device 505 includes transmission logic 506 to transmit data to device 510 and receiving logic 507 to receive data from device 510. In other words, two transmitting paths, i.e. paths 516 and 517, and two receiving paths, i.e. paths 518 and 519, are included in a PCIe link.

A transmission path refers to any path for transmitting data, such as a transmission line, a copper line, an optical line, a wireless communication channel, an infrared communication link, or other communication path. A connection between two devices, such as device 505 and device 510, is referred to as a link, such as link 515. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 516 and 517, to transmit differential signals. As an example, when line 516 toggles from a low voltage level to a high voltage level, i.e., a rising edge, line 517 drives from a high logic level to a low logic level, i.e. a falling edge. Differential signals potentially demonstrate better electrical characteristics, such as better signal integrity, i.e., cross-coupling, voltage overshoot/undershoot, ringing, etc. This allows for better timing window, which enables faster transmission frequencies.

Figure 6:
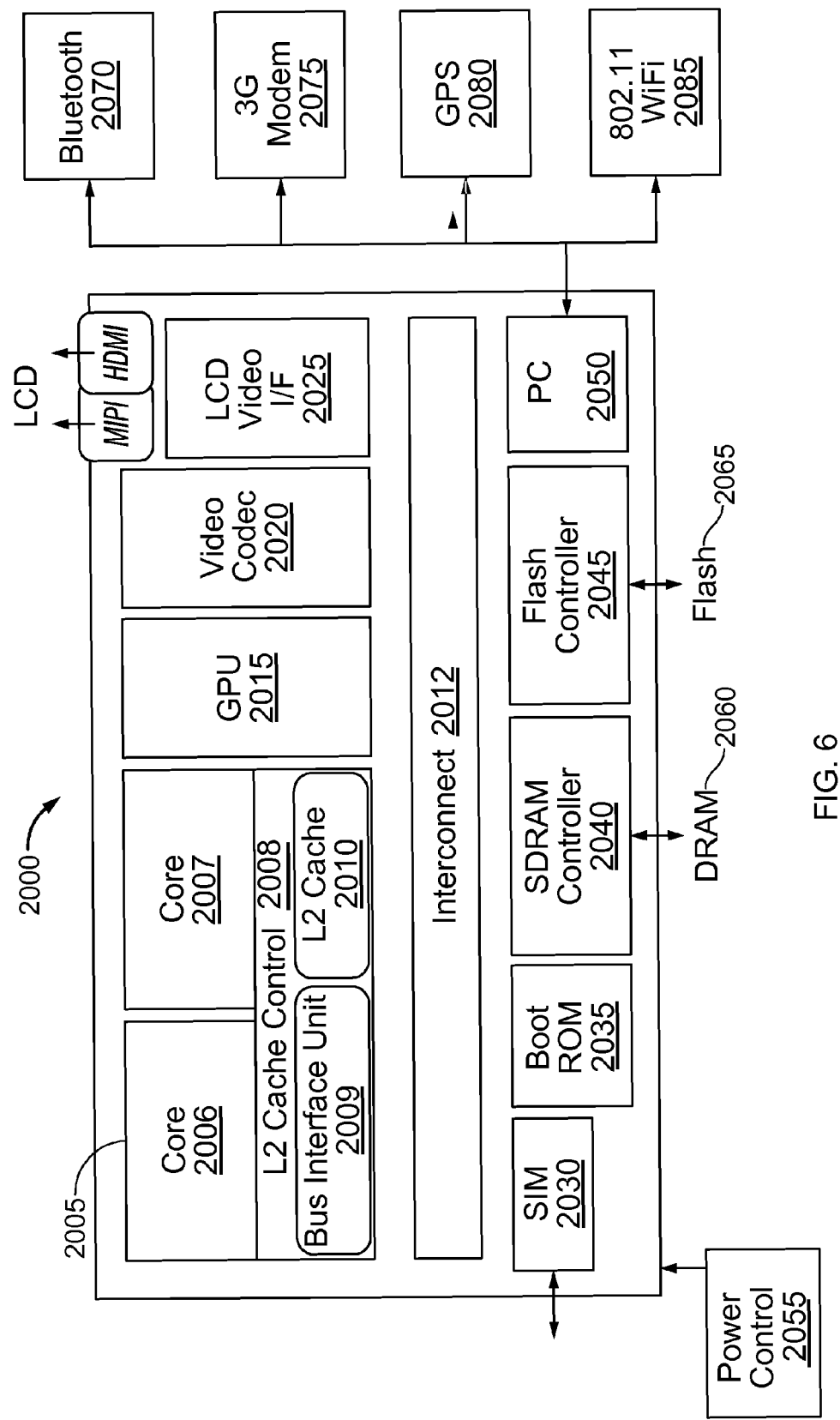
FIG. 6 is a block diagram of a SoC design in accordance with an embodiment.

Turning next to FIG. 6, an embodiment of a SoC design in accordance with an embodiment is depicted. As a specific illustrative example, SoC 2000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 2000 includes 2 cores—2006 and 2007. Similar to the discussion above, cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2010 to communicate with other parts of system 2000. Interconnect 2012 includes an on-chip interconnect, such as an IOSF, AMBA, or other interconnect discussed above, which potentially implements one or more aspects of the described herein.

Interconnect 2012 provides communication channels to the other components, such as a Subscriber Identity Module (SIM) 2030 to interface with a SIM card, a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral controller 2050 (e.g. Serial Peripheral Interface) to interface with peripherals, video codecs 2020 and Video interface 2025 to display and receive input (e.g. touch enabled input), GPU 2015 to perform graphics related computations, etc. Any of these interfaces may incorporate aspects described herein.

In addition, the system illustrates peripherals for communication, such as a Bluetooth module 2070, 3G modem 2075, GPS 2080, and WiFi 2085. Also included in the system is a power controller 2055. Note as stated above, a UE includes a radio for communication. As a result, these peripheral communication modules are not all required. However, in a UE some form a radio for external communication is to be included.

In various embodiments, a hardware-based bit error rate (BER) estimator is provided within receiver circuitry, e.g., within a receiver front end circuit. More specifically, this estimator is a blind estimator, in that errors used to estimate BER are determined without knowledge of the transmitted (and received data). Stated another way, BER can be estimated in a blind way, without using a loopback path between transmitter and receiver and without a priori knowledge of the data pattern under analysis. Using this BER estimator, BER measurements can be performed when a high-speed interconnect is operational, allowing error performance monitoring and adaptive control of one or more components of the receiver and/or transmitter, as will be described herein.

In embodiments, a plurality of parallel comparators or hard decision units (also referred to herein as slicers) each may be used to receive and generate a bitstream. Although some embodiments contemplate the use of two parallel slicers, understand that the scope of the present invention is not limited in this regard and in other cases more than two parallel slicers may be present.

Figure 7A:
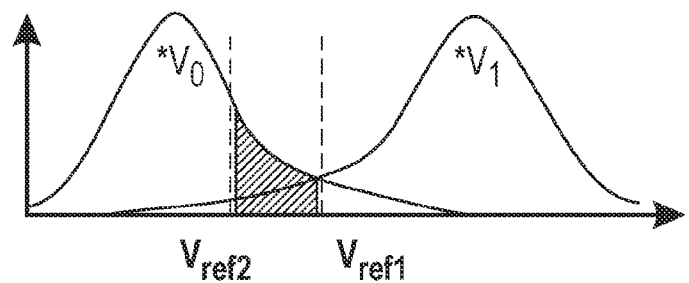
FIG. 7A is a graphical illustration of probability density functions in accordance with an embodiment of the present invention.
Figure 7A:
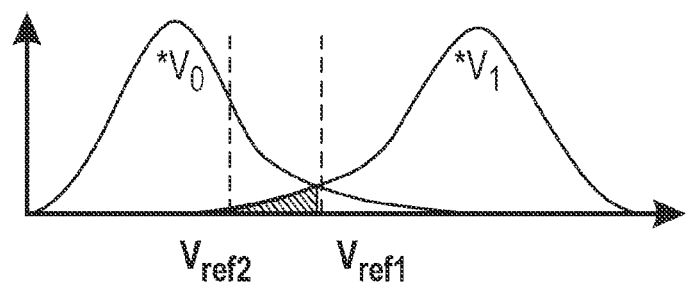

Referring now to FIG. 7A, shown are graphical illustrations of probability density functions, with shaded regions indicating locations of erroneous bit indications when used with particular reference voltage levels for two slicers or one slicer. The goal of using a second slicer is to estimate the BER corresponding to the first slicer in a blind way. To understand the basic principles for blind BER estimation, consider that a voltage signal Vin represents a sampled voltage at a slicer input and this signal has a conditional probability density function (PDF) composed of two individual PDFs; one corresponding to bit 0 and one corresponding to bit 1, namely V0 and V1 respectively (as shown in FIG. 7A). The shaded region in FIG. 7A shows transmitted logic 0's that would erroneously be identified as logic 1's and logic 1's that would be erroneously identified as logic 0's. To measure the BER, the number of transmitted logic 1's that would be erroneously classified as logic 0's is added to such erroneously classified logic 1's. In this analysis, threshold voltages (which is the voltage to which an incoming voltage is compared to determine whether the incoming signal is a logic 0 or 1) for the slicers that generate recovered bitstreams are shown as Vref1/Vref2. Thus, assuming that the slicers have reference voltages Vref1/Vref2 respectively, the BER in the recovered bitstream at the output is calculated based on the erroneous bits and error-free bits of the slicer outputs.

Figure 7B:
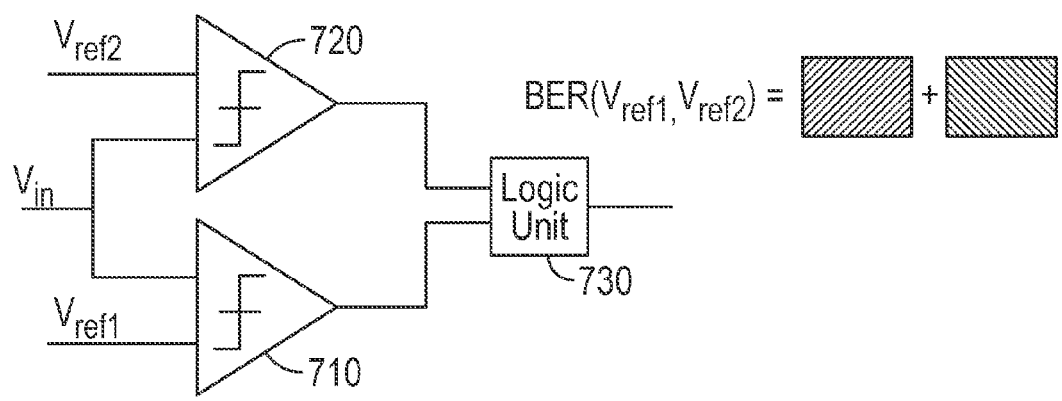
FIG. 7B is a block diagram of a portion of a BER estimator circuit in accordance with an embodiment of the present invention.

FIG. 7B is a block diagram of a portion of a BER estimator circuit having two parallel comparators or slicers 710 and 720. As seen, both slicers are configured to receive an incoming analog signal (Vin) and a different reference voltage level (Vref1/Vref2) to which the incoming analog signal is to be compared to determine whether a bit recovered from the signal is a logic 0 or logic 1. The resulting decisions by slicers 710 and 720 are provided to a logic unit 730, which in an embodiment may be configured as an exclusive-OR gate. Thus when the decisions of the two units agree, there is no generated error and the output of logic unit 730 is of a zero value (arbitrarily), and instead is a logic 1 when the outputs differ, indicating a generated error.

Thus as seen in FIGS. 7A and 7B the bitstreams obtained from the parallel slicers are used to generate artificial errors, and by calculating a ratio between erroneous bits (taken from the output of logic unit 730) and error-free bits (taken from the output of slicers 710, 720), a BER is measured for a particular reference voltage level Vref2.

Note that the reference voltage may be adapted (e.g., swept) in the second slicer, to obtain different BER measurements as the reference voltage Vref2 goes from upper to lower halves of the eye. With the reference voltage Vref1 shown in FIG. 7A, the first slicer produces a lower BER than the stream associated with the second slicer operating at a threshold voltage of Vref2. Now consider that after performing a BER measurement using Vref2 (when reference voltage Vref1 gives a lower BER than Vref2), the reference voltage Vref1 is changed to Vref2. In that case, the artificial errors generated by the second slicer when Vref1 was chosen to generate a lower BER become actual errors and therefore the BER measured using the second slicer will be the actual BER corresponding to the first slicer operating at Vref2. Stated in another way, BER measurements performed when Vref1 produces a lower BER than Vref2 are same as BER measurements corresponding to the first slicer performed using any class of supervised technique (loopback, a priori knowledge of the pattern, etc.). However, as Vref2 approximates Vref1, the measured BER becomes close to zero. Yet BER in this region can be estimated by extrapolating the measured data when Vref2<Vref1 (for the upper half of the eye) and Vref2>Vref1 (for the lower half of the eye). Bearing in mind that Gaussian noise is responsible for the low BER region, BER can be estimated by transforming measured data points to the Q-scale, finding a linear trend in the measured data, extrapolating the linear points, and then converting the extrapolated data to a BER scale. Note that Q-scale transformation is a way to represent the cumulative density function (CDF) of a Gaussian PDF as a linear function. In particular, the standard deviation is the inverse of the slope and the mean of the Gaussian function is estimated at the intercept point where Q=0. In this way, the BER associated with the first slicer can be estimated in a blind way by using a second slicer having a variable reference voltage. A full eye scan can be performed if the same principle as described above is applied for different sampling phases.

Using an embodiment of the present invention, a BER estimator can be used at a physical layer of any high-speed interconnect to perform a full eye scan, to monitor error performance and/or to manage power consumption while maintaining acceptable error performance. Furthermore, the BER estimator can be used also as a validation tool to access BER data using an external device (such as coupled via a Joint Test Action Group (JTAG) interface) in order to quantify voltage and time margins. Moreover, embodiments can be used for component optimization and design (e.g., equalizer taps) in high-speed links.

Note that depending on the signaling scheme used in the interconnect, the slicers can be single-ended or differential. In the single-ended case, a slicer uses Vref as the decision threshold, and a differential slicer uses Voffset to compensate for the implicit zero decision threshold.

The probability of receiving an erroneous bit in a bitstream $d_k$ is a function of transmitter and receiver settings/noise, and the interconnection channel characteristics. All those settings and noises will determine the voltage and time eye margins.

Figure 8A:
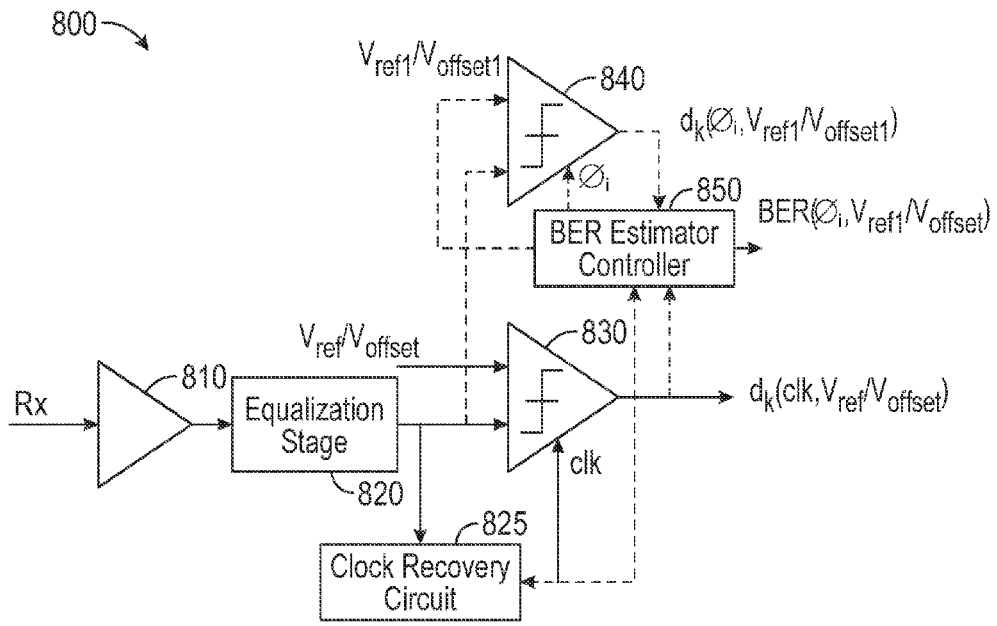
FIG. 8A is a block diagram of a portion of a receiver in accordance with an embodiment of the present invention.

Referring now to FIG. 8A, shown is a block diagram of a portion of a receiver in accordance with an embodiment of the present invention. In an embodiment, receiver 800 is a high speed receiver, e.g., associated with a high speed link such as a given input/output (IO) interconnect.

In general, receiver 800 includes a data path having an automatic gain control (AGC) circuit 810 which may be configured as one or more amplifiers to receive an incoming analog signal Rx and appropriately condition the signal and provide it to an equalizer 820. In different implementations, equalizer 820 may be a decision feedback equalizer. The resulting equalized signal is provided to a first slicer 830, which may be a main data path slicer. As seen, in addition to receiving the equalized signal, slicer 830 further receives a reference voltage level (Vref/Voffset) and a clock signal such that its sampling decision is according to the clock signal and based on the reference voltage level. Note in the embodiment of FIG. 8A that receiver 800 is configured as an embedded clock architecture such that a clock recovery circuit 825 recovers a sampling clock from the equalized data received from equalizer 820 and provides this clock signal to slicer 830.

Thus slicer 830 operates to determine whether a sampled portion of the incoming signal is a logic 0 or a logic 1 and provides this output to a consuming logic, such as one or more intellectual property (IP) logic blocks of a processor or SoC (not shown in FIG. 8A), as a recovered bitstream $d_k$ (clk, Vref/Voffset).

As further illustrated in FIG. 8A, in addition slicer 830 provides its bit decisions to a BER estimator controller 850. Controller 850 is further coupled to a second or auxiliary slicer 840 also configured to receive the equalizer output. In addition, controller 850 provides a different and sweeping reference voltage level (Vref1/Voffset1) to slicer 840. In addition, as described herein slicer 840 performs its sampling responsive to a different clock signal, namely a phase signal (which may be a swept clock signal) received from controller 850. In turn, its decision bits are provided to BER estimator controller 850. Based on the decision bits from the two slicers, controller 850 determines a corresponding BER. Understand while shown at this high level in the embodiment of FIG. 8A, the scope of the present invention is not limited in this regard.

Figure 8B:
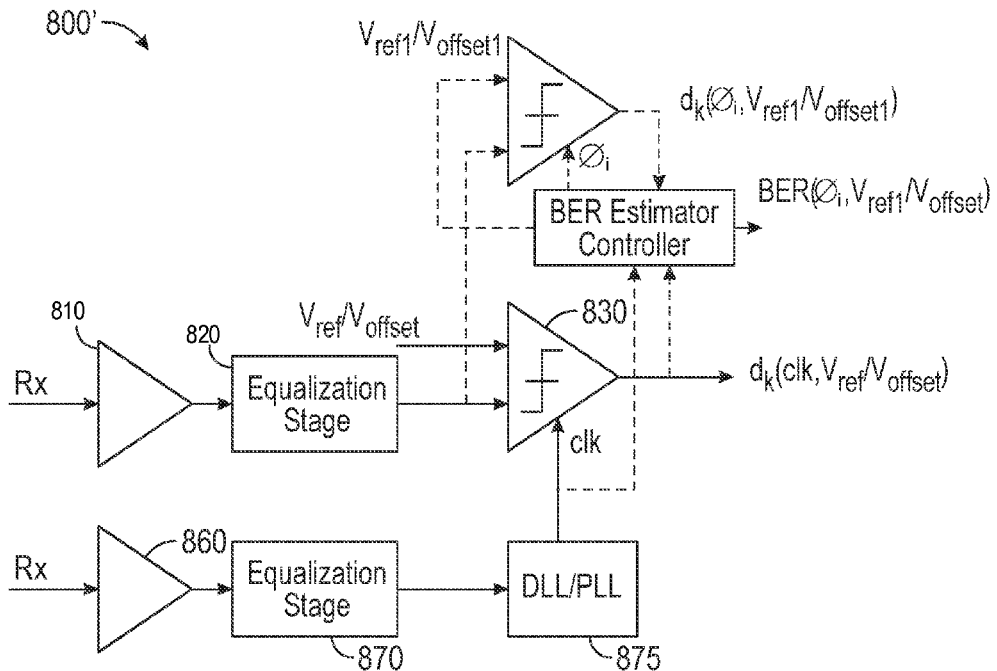
FIG. 8B is a block diagram of a portion of a receiver in accordance with another embodiment of the present invention.

For example, a receiver may similarly be adapted in a forwarded clock architecture. In such an embodiment, note that an additional clock path is provided within the receiver. This is shown in FIG. 8B, which is a block diagram of a receiver in accordance with another embodiment of the present invention. As seen in FIG. 8B, receiver 800' may generally be configured the same as receiver 800. However, note the presence of a parallel clock path including a second AGC circuit 860 configured to receive the incoming clock signal, a second equalizer 870, and a delay locked loop/phase locked loop (DLL/PLL) 875 that thus generates the appropriate clock signal for slicer 830 and controller 850.

In the architectures of both FIGS. 8A and 8B, slicer 840 is used to generate a bitstream $d_k(\emptyset_i, \text{Vref1/Voffset1})$. This bitstream is produced by sampling the incoming analog waveform RX at a clock phase $\emptyset_i$ and comparing it to the decision threshold Vref1/Voffset1. The clock phase $\emptyset_i$ is produced by controller 850 using a phase interpolator (not shown in FIGS. 8A and 8B) in order to sweep sampling time if a full eye-scan operation mode is implemented in BER estimator controller 850. On the other hand, the bitstream $d_k$(clk, Vref/Voffset) is the recovered data from the interconnect using Vref/Voffset and the clock (recovered or forwarded), at a static reference voltage level and clock phase.

Figure 9:
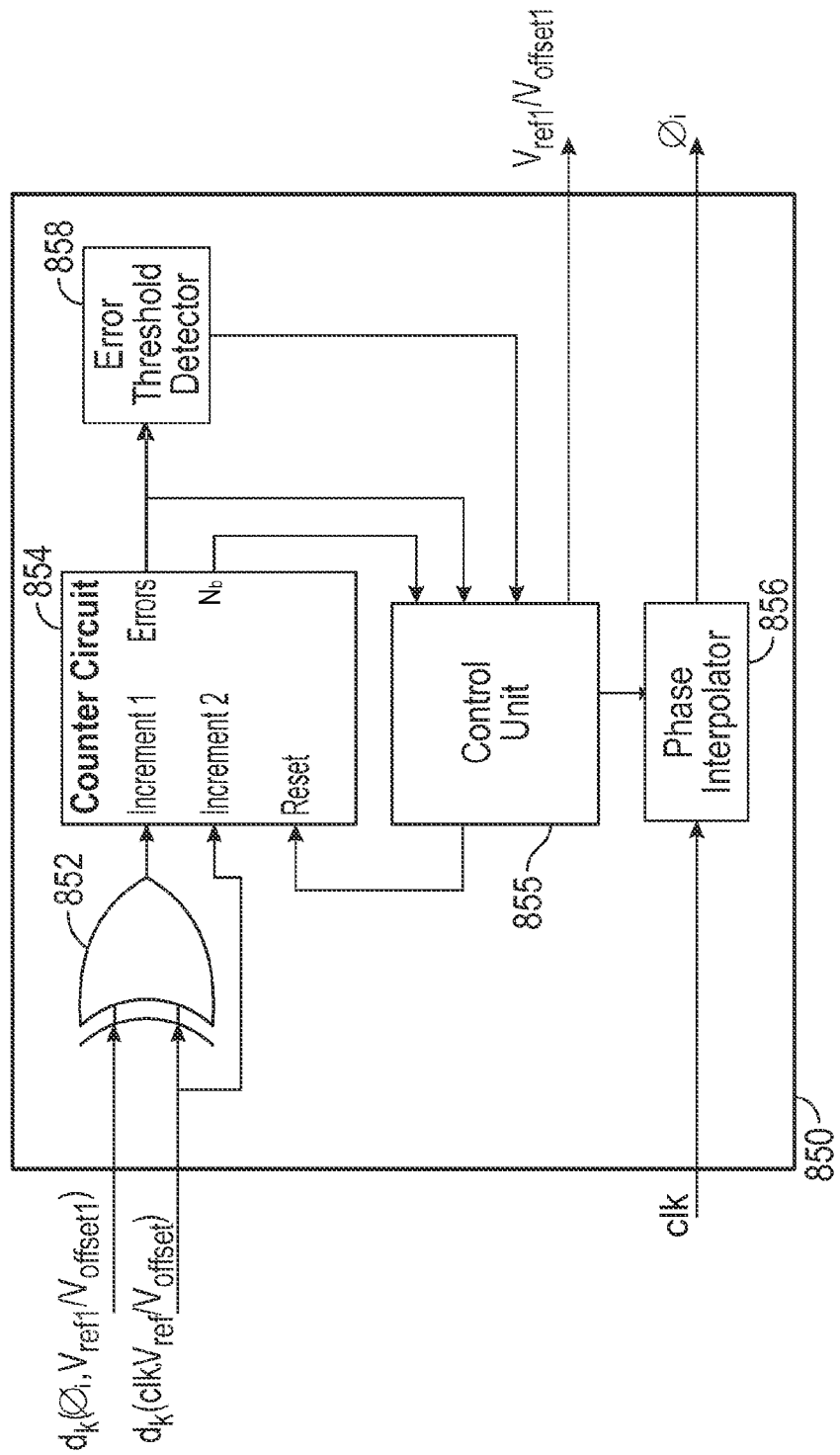
FIG. 9 is a block diagram of a BER estimator controller in accordance with an embodiment.

Referring now to FIG. 9, shown is a block diagram of further details of a BER estimator controller in accordance with an embodiment. In FIG. 9, controller 850 corresponds to controller 850 of FIGS. 8A and 8B. As seen in FIG. 9, controller 850 includes an XOR logic 852 configured to receive the bit decisions from the two slicers to detect generated errors. In turn, the recovered bits from the first slicer and the output of XOR logic 852 are provided to a counter circuit 854 including a plurality of counters. Counter circuit 854 is controlled by a control unit 855, which is further configured to control a phase interpolator 856 and to receive information from an error threshold detector 858, as further described herein.

Considering that clk and Vref/Voffset are chosen to produce a bitstream with a very low BER (achieved by time/voltage eye margining methods implemented in most receivers today), controller 850 produces a Vref1/Voffset1 (larger than Vref/Voffset for the lower half of the eye and smaller than Vref/Voffset for the upper half of the eye) and an initial clock phase $\emptyset_i$. Counter circuit 854 includes a plurality of resettable counters to count the errors generated from XOR logic 852 and the number of error-free bits (Errors and Nb, respectively in FIG. 9). When a predetermined number of errors Ne is reached, as determined by an error threshold detector 858, controller 850 measures the BER as Ne/Nb, transforms this measurement to the Q-scale and it is collected together with previous measurement points. Then a signal is sent to counter circuit 854, to reset its counters to zero. At this same point, reference voltages are updated (swept) to Vref1/Voffset1±Δ to measure a new BER point.

This process is performed until controller 850 detects a linear trend in the Q-measured data (for both upper and lower halves of the eye). Then, controller 850 performs a linear extrapolation in the Q-scale to complete the BER measurement at the given clock phase $\emptyset_i$. After extrapolation, controller 850 produces a control signal for phase interpolator 856 to produce a new clock phase $\emptyset_{i+1}$, and the initial Vref1/Voffset1 value is selected again if the full eye-scan operation mode is enabled, and if not the BER estimation is finished. For full eye-scan operation mode, the process described above is repeated until all possible sampling phased are used. In one example between 32 to 128 different phases may be used depending on the architecture/technology of the phase interpolator circuit. After full eye-scan is performed, the Tx/Rx front-ends can be re-adjusted to optimize BER performance. However, if the BER is very low, a different operating point can be selected to reduce power, optimize error performance, increase speed, etc., based on the particular eye-scan results. In this way, the upper and lower halves of the eye can be measured, and BER can be determined as a function of voltage and sampling time, without interrupting the interconnect service.

Figure 10:
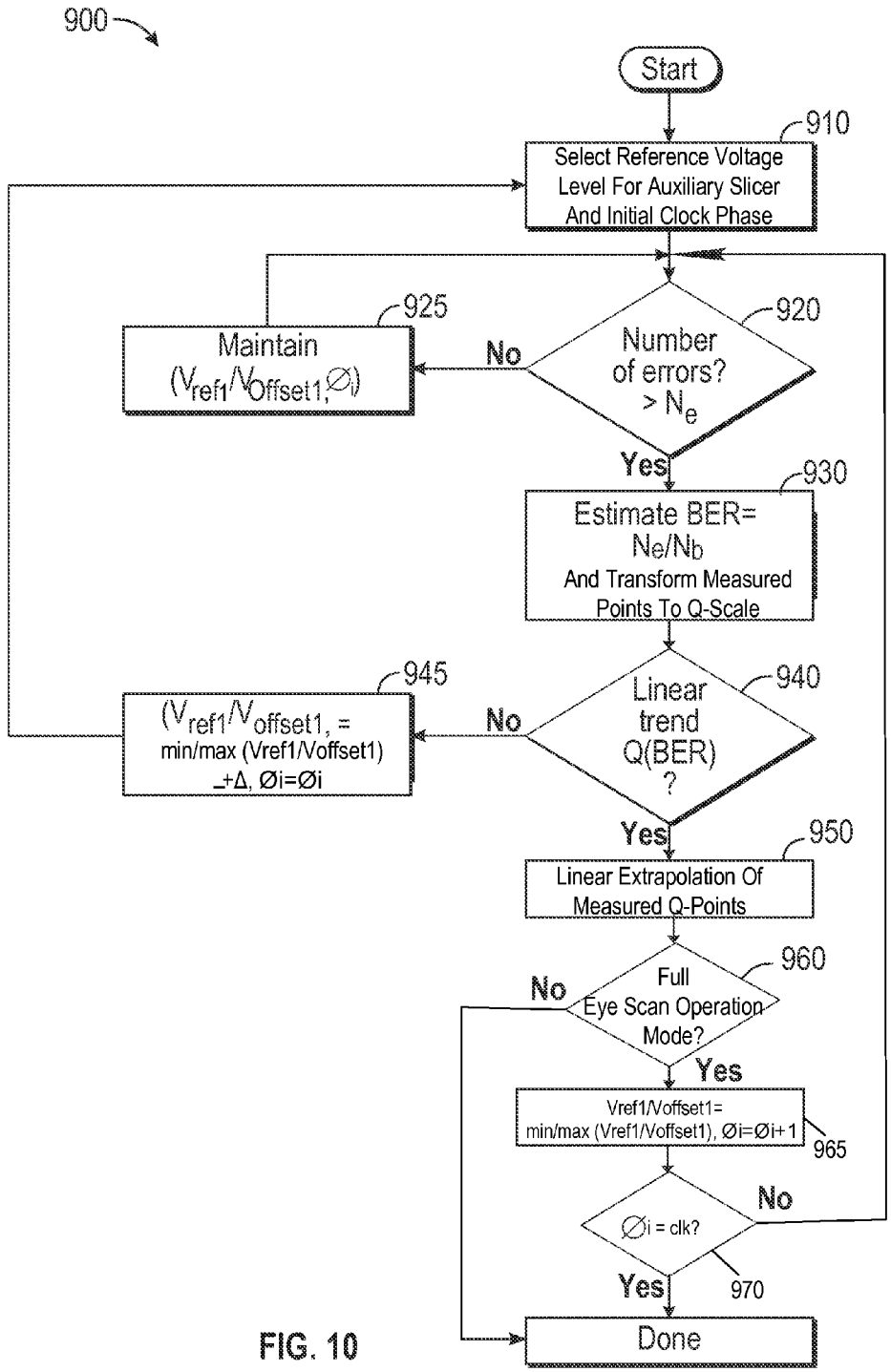
FIG. 10 is a flow diagram of a method in accordance with an embodiment of the present invention.

Referring now to FIG. 10, shown is a flow diagram of a method in accordance with an embodiment of the present invention. As shown in FIG. 10, method 900 may be performed by a BER estimator controller or other controller of a receiver which in various embodiments may be implemented by appropriate combinations of one or more hardware, software, and/or firmware. As another example, such logic may be configured as one or more microcontrollers.

As illustrated in FIG. 10, method 900 begins by selecting the reference voltage level for an auxiliary slicer (block 910) and an initial clock phase clk. Next, after analyzing the incoming analog signal for an evaluation time it is determined whether the number of errors exceeds an error threshold (diamond 920). If not, continued sampling at the current reference voltage level occurs at block 925.

Instead when the error threshold is exceeded, control passes to block 930 where BER is measured and transformed to the Q-scale. Thereafter it is determined whether a linear trend of Q-scale measured points can be determined. If not, the reference voltage level is adjusted (at block 945) and control passes again to diamond 920.

Instead when the linear trend can be determined, control passes to block 950 where a linear extrapolation process is performed and thereafter the phase at which the auxiliary sampler operates may be adjusted if the full eye scan operation mode is enabled (at diamond 960), such that the same operations are done for the other half of the eye (at blocks 965 and 970) until all such desired sampling phases have been exercised such that the method concludes. The BER estimation corresponding to the reference voltage Vref1 is performed by taking the inverse Q-scale transform of the quantity Q=Slope*Vref1+Intercept, where Slope and Intercept are the quantities resulting from the linear extrapolation carried out to the Q-measured points. Understand while shown at this high level in the embodiment of FIG. 10, the scope of the present invention is not limited in this regard.

Figure 11:
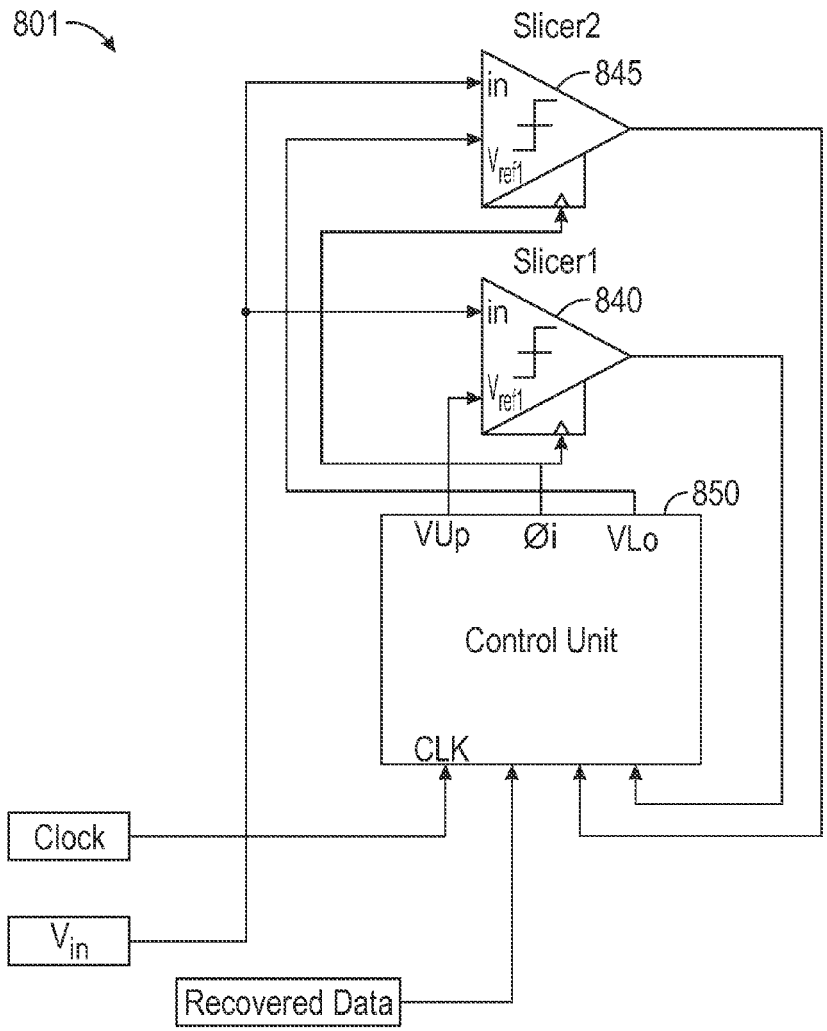
FIG. 11 is a block diagram of a portion of a BER estimation circuit in accordance with another embodiment.

Since the BER measurement is a random variable, the confidence interval of the measurement and therefore the estimation is determined by the number of errors used in the estimation. While more errors can be observed to estimate BER more accurately, the estimation time becomes longer. In embodiments, it is possible to reduce the time incurred to sweep the entire eye by adding more auxiliary slicers. Referring now to FIG. 11, shown is a block diagram of a portion of a BER estimation circuit in accordance with another embodiment. As shown in FIG. 11, circuit 801 includes a controller 850 (which may be configured as described above) and a plurality of auxiliary slicers 840 and 845. Note that the main data path is not shown in FIG. 11 for ease of illustration. However, note that the recovered bitstream from the main slicer is provided to controller 850, along with a clock signal (however obtained). Further, the incoming analog signal Vin is provided to the two slicers, along with their different reference voltage levels, along with the same phase signal as received from controller 850. For instance, a BER estimator having two auxiliary slicers as shown in FIG. 11 consumes 2× less time to perform a full sweep than using a single auxiliary slicer. In the embodiment of FIG. 11, VUp is used as a reference voltage for slicer 840 to sweep the upper half of the eye, whereas VLo is used as a reference voltage for slicer 845 to sweep the lower half.

Figure 12:
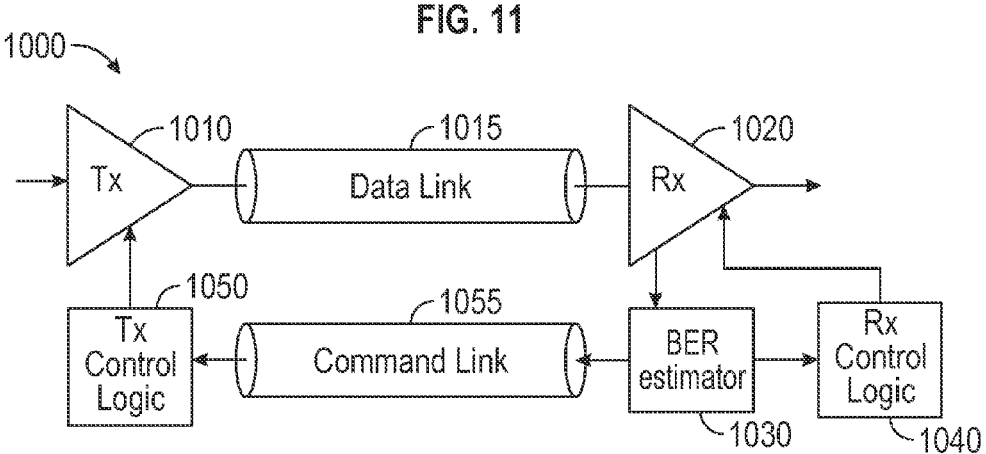
FIG. 12 is a block diagram of a high speed interface circuit in accordance with an embodiment of the present invention.

Referring now to FIG. 12, shown is a block diagram of a high speed IO interface circuit 1000 between a transmitter 1010 and a receiver 1020. As seen, transmitter 1010 is coupled via a data link 1015 to receiver 1020. Although the scope of the present invention is not limited in this regard, circuit 1000 may be any type of high speed interface circuit such as a serial-based serial deserializer (SERDES) circuit.

As illustrated in FIG. 12, receiver 1020 provides information (e.g., from multiple slicer paths) to a BER estimator 1030, as discussed above. This BER estimate information may be provided to a receiver control logic 1040 and, via a command link 1055 (which in an embodiment may be a different interconnect), to a transmitter control logic 1050. Based on such information one or more of transmitter 1010 and receiver 1020 can have one or more of its component settings controlled appropriately, e.g., to reduce power consumption and/or to improve performance. In particular, re-adjustment of the equalizer settings (disable some taps or disable the decision feedback equalizer (DFE), change continuous time linear equalizer (CTLE) characteristics, etc.) or re-adjustment of transmitter settings (reduce swing, disable the transmitter linear equalization (TXLE) taps) can be done to reduce power. Alternatively, re-adjustment of equalization scheme/transmitter characteristics can be performed to achieve better BER performance, if online measurements show unacceptable error rate. While not shown understand that it is further possible for the BER estimate information determined in BER estimator 1030 to be provided to an external source, e.g., via a JTAG interface. Understand while shown at this high level in the view of FIG. 12, many variations and alternatives are possible.

Thus a BER estimator in accordance with an embodiment of the present invention can be used to explore the impact of transmitter/receiver settings in interconnect error performance. As such, a BER estimator can be used as a part of an adaptive solution to optimize settings such as taps in a DFE, a TXLE, bandwidth in a CTLE, transmitter strength, etc.

Although the scope of the present invention is not limited in this regard, embodiments may be used to measure performance of a variety of high-speed interconnects, including but not limited to Peripheral Component Interconnect Express (PCIe), universal serial bus (USB), and double data rate (DDR) interconnects. As such, embodiments ensure interconnects within guaranteed error performance in the product lifecycle and/or better power consumption. Furthermore, a BER estimator in accordance with an embodiment of the present invention can reduce validation efforts for high-speed devices and also provide an adaptive engine for such interconnects to ensure acceptable error performance in order to avoid silent data corruption problems, and further help to reduce power consumption in mobile devices because adaptive tuning of the transmitted/receiver settings can be performed to recover margin lost due to variations in the manufacturing process or variations in the operation conditions.

Embodiments can be used to monitor error performance when an interconnect is operational, in contrast to, e.g., loopback-based BER testing for validation or debug purposes.

This is so, as while the loopback is established, a link cannot be used to transfer non-test information, since the data at the receiver is to be forwarded back to the transmitter. Embodiments also provide online BER measurements without the need for external equipment, which can be very complex, expensive, and further may introduce perturbations that are difficult to eliminate or quantify.

The following examples pertain to further embodiments.

In one example, an apparatus comprises: a data path including a first slicer to receive and sample an incoming analog signal and to determine a bit level for the incoming analog signal, the first slicer to provide a bit decision to a consuming logic; an analysis path including a second slicer to receive and sample the incoming analog signal and to determine a second bit level for the incoming analog signal; and a controller coupled to receive an output of the first slicer and an output of the second slicer to determine a BER for the data path based on the first and second slicer outputs.

In an example, the controller is to determine the bit error rate without a priori information regarding the incoming analog signal.

In an example, the controller is to dynamically sweep a reference voltage level for the second slicer, where a reference voltage level for the first slicer is to be static, the controller further to dynamically sweep a reference phase for the second slicer, where a reference clock for the first slicer is to be static.

In an example, the controller comprises: a first counter to maintain a first count of a number of incoming bits of the incoming analog signal for an evaluation interval; a second counter to maintain a second count of a number of errors in the incoming bits of the incoming analog signal for the evaluation interval; and a logic to determine the BER based at least in part on the first and second counts.

In an example, the controller includes a control unit to: iteratively adjust a phase for the second slicer to a plurality of phases; and for the plurality of phases, iteratively adjust a reference voltage level for the second slicer and estimate the BER according to the reference voltage level, until a linear trend regarding the BER is determined, and thereafter extrapolate the linear trend to determine the BER for the corresponding phase.

In an example, the controller is to communicate the BER to a transmitter coupled to the apparatus, the transmitter to transmit the incoming analog signal to the apparatus.

In an example, the apparatus is to receive the incoming analog signal with a reduced amplitude after communication of the BER, the transmitter to reduce the amplitude of the incoming analog signal to reduce power consumption of the transmitter.

In an example, the apparatus comprises a first integrated circuit (IC) to be configured on a circuit board and the transmitter comprises a second IC to be configured on the circuit board and to be coupled to the apparatus via an interconnect of the circuit board.

In an example, the data path further comprises: one or more gain control circuits to receive and amplify the incoming analog signal; an equalizer coupled to the one or more gain control circuits to equalize the amplified incoming analog signal and to provide the equalized amplified incoming analog signal to the first slicer and the second slicer.

In an example, a control logic is to control at least one of the one or more gain control circuits and the equalizer based at least in part on the BER.

In an example, the control logic is to disable at least a portion of the equalizer when the BER is less than a threshold level.

In an example, the analysis path further includes a third slicer, the third slicer to receive and sample the incoming analog signal and to determine a third bit level for the incoming analog signal, the controller to determine the BER for the data path further based on the third slicer output.

Note that the above apparatus may be part of a processor implemented using various means.

In an example, the apparatus may be part of a system on a chip incorporated in a user equipment touch-enabled device.

In another example, a system comprises a display and a memory, and includes the processor having the apparatus of one or more of the above examples.

In yet another example, a method for estimating a bit error rate comprises: enabling a second slicer of a parallel path of a receiver to receive an incoming analog signal and generate a second bitstream therefrom at a plurality of reference voltage levels for the second slicer, the receiver further including a data path having a first slicer to receive the incoming analog signal and generate a first bitstream; estimating, in a controller, a BER at the plurality of reference voltage levels based at least in part on comparing the second bitstream to a corresponding portion of the first bitstream to determine a number of errors at the plurality of reference voltage levels in one of the first bitstream and the second bitstream; and controlling, by the controller, at least one component of the data path responsive to the BER estimated at one or more of the plurality of reference voltage levels.

In an example, the method further comprises estimating the BER without a priori information regarding the incoming analog signal.

In an example, the method further comprises dynamically sweeping through at least some of the plurality of reference voltage levels at a plurality of phases for the second slicer, where a reference voltage level and a reference clock for the first slicer are to be static.

In an example, the method further comprises: iteratively adjusting a phase for the second slicer to a plurality of phases; and for the plurality of phases, iteratively adjusting a reference voltage level for the second slicer to one of the plurality of reference voltage levels and estimating the BER according to the reference voltage level, until a linear trend regarding the BER is determined, and thereafter extrapolating the linear trend to determine the BER for the corresponding phase.

In another example, a machine-readable storage medium includes machine-readable instructions, when executed, to implement a method of any of the above examples.

In another example, an apparatus comprises means for performing the method of any one of the above examples.

In another example, a system comprises a transmitter to transmit an analog signal; and a receiver coupled to the transmitter by an interconnect, the receiver to receive the analog signal and determine a BER for a bitstream recovered from the analog signal during runtime of the system, without a priori knowledge of a data pattern of the analog signal.

In an example, the receiver comprises a first comparator to sample the analog signal to generate first bit decisions for the analog signal according to a first reference level, a second comparator to sample the analog signal to generate second bit decisions for the analog signal according to a second reference level, and a controller coupled to receive the first and second bit decisions and to determine the BER based at least in part thereon.

In an example, the controller comprises a first counter to maintain a first count of a number of bits of the bitstream for an evaluation interval, a second counter to maintain a second count of a number of errors in the bitstream for the evaluation interval, and a logic to determine the BER based at least in part on the first and second counts.

In an example, the controller includes a control unit to iteratively adjust a phase for the second comparator to a plurality of phases, and for the plurality of phases, iteratively adjust the second reference level and estimate the BER according to the second reference level, until a linear trend regarding the BER is determined, and thereafter extrapolate the linear trend to determine the BER for the corresponding phase.

In an example, the receiver is to communicate the BER to the transmitter, and the transmitter is to reduce an amplitude of the analog signal based on comparison of the BER to a threshold, the reduced amplitude to reduce power consumption of the transmitter.

In an example, the receiver comprises one or more gain control circuits to receive and amplify the analog signal, an equalizer coupled to the one or more gain control circuits to equalize the amplified analog signal and to provide the equalized amplified analog signal to the first comparator and the second comparator, In an example, a control logic is to control at least one of the one or more gain control circuits or the equalizer based at least in part on the BER.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A receiver comprising:
   a data path including a first slicer to receive and sample an incoming analog signal and to determine a bit level for the incoming analog signal, the first slicer to provide a bit decision to a consuming logic;
   an analysis path including a second slicer to receive and sample the incoming analog signal and to determine a second bit level for the incoming analog signal; and
   a controller coupled to receive an output of the first slicer and an output of the second slicer to determine a bit error rate (BER) for the data path based on the first and second slicer outputs, wherein the controller is to dynamically sweep a reference voltage level for the second slicer, wherein a reference voltage level for the first slicer is to be static, the controller further to dynamically sweep a reference phase for the second slicer, wherein a reference clock for the first slicer is to be static.

2. The receiver of claim 1, wherein the controller is to determine the bit error rate without a priori information regarding the incoming analog signal.

3. The receiver of claim 1, wherein the controller comprises:
   a first counter to maintain a first count of a number of incoming bits of the incoming analog signal for an evaluation interval;
   a second counter to maintain a second count of a number of errors in the incoming bits of the incoming analog signal for the evaluation interval; and
   a logic to determine the BER based at least in part on the first and second counts.

4. The receiver of claim 1, wherein the controller includes a control unit to:
   iteratively adjust a phase for the second slicer to a plurality of phases; and
   for the plurality of phases, iteratively adjust a reference voltage level for the second slicer and estimate the BER according to the reference voltage level, until a linear trend regarding the BER is determined, and thereafter extrapolate the linear trend to determine the BER for the corresponding phase.

5. The receiver of claim 1, wherein the controller is to communicate the BER to a transmitter coupled to the receiver, the transmitter to transmit the incoming analog signal to the receiver.

6. The receiver of claim 5, wherein the receiver is to receive the incoming analog signal with a reduced amplitude after communication of the BER, the transmitter to reduce the amplitude of the incoming analog signal to reduce power consumption of the transmitter.

7. The receiver of claim 5, wherein the receiver comprises a first integrated circuit (IC) to be configured on a circuit board and the transmitter comprises a second IC to be configured on the circuit board and to be coupled to the receiver via an interconnect of the circuit board.

8. The receiver of claim 1, wherein the data path further comprises:
   one or more gain control circuits to receive and amplify the incoming analog signal;
   an equalizer coupled to the one or more gain control circuits to equalize the amplified incoming analog signal and to provide the equalized amplified incoming analog signal to the first slicer and the second slicer.

9. The receiver of claim 8, further comprising a control logic to control at least one of the one or more gain control circuits and the equalizer based at least in part on the BER.

10. The receiver of claim 9, wherein the control logic is to disable at least a portion of the equalizer when the BER is less than a threshold level.

11. The receiver of claim 1, wherein the analysis path further includes a third slicer, the third slicer to receive and sample the incoming analog signal and to determine a third bit level for the incoming analog signal, the controller to determine the BER for the data path further based on the third slicer output.

12. A non-transitory machine-readable medium having stored thereon instructions, which if performed by a machine cause the machine to perform a method comprising:
    enabling a second slicer of a parallel path of a receiver to receive an incoming analog signal and to generate a second bitstream therefrom at a plurality of reference voltage levels for the second slicer including dynamically sweeping through at least some of the plurality of reference voltage levels at a plurality of phases for the second slicer, the receiver further including a data path having a first slicer to receive the incoming analog signal and to generate a first bitstream, wherein a reference voltage level and a reference clock for the first slicer are to be static;
    estimating, in a controller, a bit error rate (BER) at the plurality of reference voltage levels based at least in part on comparing the second bitstream to a corresponding portion of the first bitstream to determine a number of errors at the plurality of reference voltage levels in one of the first bitstream and the second bitstream; and
    controlling, by the controller, at least one component of the data path responsive to the BER estimated at one or more of the plurality of reference voltage levels.

13. The non-transitory machine-readable medium of claim 12, further comprising instructions that enable the controller to estimate the BER without a priori information regarding the incoming analog signal.

14. The non-transitory machine-readable medium of claim 12, further comprising instructions that enable the controller to:
    iteratively adjust a phase for the second slicer to the plurality of phases; and
    for the plurality of phases, iteratively adjust a reference voltage level for the second slicer to one of the plurality of reference voltage levels and estimate the BER according to the reference voltage level, until a linear trend regarding the BER is determined, and thereafter extrapolate the linear trend to determine the BER for the corresponding phase.

15. A system comprising:
    a transmitter to transmit an analog signal; and
    a receiver coupled to the transmitter by an interconnect, the receiver to receive the analog signal and determine a bit error rate (BER) for a bitstream recovered from the analog signal during runtime of the system, without a priori knowledge of a data pattern of the analog signal, wherein the receiver is to communicate the BER to the transmitter, and wherein the transmitter is to reduce an amplitude of the analog signal based on comparison of the BER to a threshold, the reduced amplitude to reduce power consumption of the transmitter.

16. The system of claim 15, wherein the receiver comprises a first comparator to sample the analog signal to generate first bit decisions for the analog signal according to a first reference level, a second comparator to sample the analog signal to generate second bit decisions for the analog signal according to a second reference level, and a controller coupled to receive the first and second bit decisions and to determine the BER based at least in part thereon.

17. The system of claim 16, wherein the controller comprises a first counter to maintain a first count of a number of bits of the bitstream for an evaluation interval, a second counter to maintain a second count of a number of errors in the bitstream for the evaluation interval, and a logic to determine the BER based at least in part on the first and second counts.

18. The system of claim 16, wherein the controller includes a control unit to iteratively adjust a phase for the second comparator to a plurality of phases, and for the plurality of phases, iteratively adjust the second reference level and estimate the BER according to the second reference level, until a linear trend regarding the BER is determined, and thereafter extrapolate the linear trend to determine the BER for the corresponding phase.

19. The system of claim 15, wherein the receiver comprises one or more gain control circuits to receive and amplify the analog signal, an equalizer coupled to the one or more gain control circuits to equalize the amplified analog signal and to provide the equalized amplified analog signal to the first comparator and the second comparator, and a control logic to control at least one of the one or more gain control circuits or the equalizer based at least in part on the BER.

\* \* \* \* \*